Patented June 30, 1942

2,288,518

UNITED STATES PATENT OFFICE 2,288,518

AZO DYESTUFFS CAPABLE OF BEING METALLIZED

Richard Fleischhauer and Adolf Müller, Frankfort-on-the-Main-Fechenheim, Germany, assignors to General Aniline & Film Corporation, a corporation of Delaware No Drawing. Application May 17, 1939, Serial No. 274,108. In Germany May 21, 1938

4 Claims. (Cl. 260—199)

The present invention relates to azo-dyestuffs capable of being metallized; more particularly it relates to dyestuffs corresponding with the following general formula:

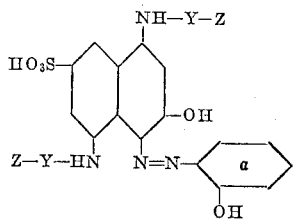

wherein the benzene nucleus $a$ may contain substituents, the Y's stand for a member of the group consisting of CO and $SO_2$ and the Z's stand for a member of the group consisting of alkyl, O-alkyl and aryl of the benzene series.

We have found that new valuable azo-dyestuffs capable of being metallized are obtained by coupling o-diazophenols with diacyl derivatives of 1.5-diamino-3-hydroxynaphthalene-7-sulfonic acid.

The coupling components used in the present process have hitherto not been described. They may be prepared according to known methods by causing acylating agents to act upon 1.5-diamino-3-hydroxynaphthalene - 7 - sulfonic acid obtainable by the process described in German Patent 91,000. Thereby also mixed acyl derivatives may be obtained if two different acylating agents are applied successively.

The dyestuffs prepared by the present invention yield, when treated according to known methods, with agents yielding chromium valuable gray to greenish-gray dyeings of very good fastness properties. Furthermore, they have in many cases a good levelling power. By suitable selection of the acyl radicals and the diazo-components it is possible to alter to a certain extent the properties and shades of the dyestuffs obtained.

The following examples serve to illustrate the invention, but they are not intended to limit it thereto; the parts are by weight:

(1) 16.8 parts of 4-methyl-6-nitro-2-amino-1-hydroxybenzene are diazotized in the usual manner. The suspension of the diazo-compound obtained is coupled with a solution of 33.8 parts of 1.5-di-(acetylamino)-3-hydroxynaphthalene-7-sulfonic acid containing sodium carbonate in excess, and the mixture is stirred until the coupling is complete.

The dyestuff is isolated and dried. It is a dark powder which dissolves in water in the presence of sodium carbonate to a blue solution and in the presence of acetic acid or mineral acids to a light-red solution. In concentrated sulfuric acid it dissolves to a bluish-red solution. The dyestuff dyes wool in an acid bath currant tints which on chroming change to gray shades of very good fastness to light, to fulling, to carbonizing and to potting. The dyestuff has a good levelling power. It corresponds with the following formula:

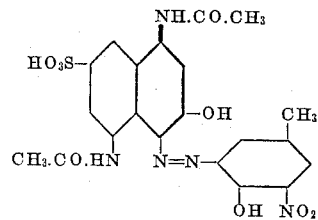

The corresponding dyestuff from 5-nitro-2-amino-1-hydroxybenzene yields on after-chroming considerably more greenish-gray tints, whereas the diazo-compound from 4-nitro-2-amino-1-hydroxybenzene, when coupled with the same component, yields a dyestuff which on after-chroming dyes wool fast olive-green tints.

(2) 22.4 parts of 4-chloro-2-amino-1-hydroxybenzene-6-sulfonic acid are diazotized in the usual manner. The diazo-solution obtained is run into a solution of 46.2 parts of 1.5-di-(benzoylamino) - 3 - hydroxynaphthalene - 7 - sulfonic acid containing sodium carbonate in excess. When the coupling is complete the dyestuff obtained is isolated and dried. It is a dark, water-soluble powder which dissolves in concentrated sulfuric acid to a violet solution and dyes wool on chroming greenish-gray tints of very good fastness to fulling and to light.

When 1.5 - di - (benzene-sulfoamino) - 3 - hydroxynaphthalene-7-sulfonic acid is used as coupling component, a dyestuff is obtained which dyes wool on chroming likewise very fast gray tints.

(3) 18.9 parts of 2-amino-1-hydroxybenzene-4-sulfonic acid are diazotized in the usual manner. The diazo-solution obtained is run into a solution of 40 parts of 1.5-di-(carbethoxyamino)-3-hydroxynaphthalene-7-sulfonic acid containing sodium carbonate in excess. When coupling is complete the dyestuff is separated and dried. The bluish-black powder thus obtained dissolves in concentrated sulfuric acid to a bluish-red solution, in an acetic acid or mineral acid solution to a red and in a sodium carbonate solution to a blue solution.

The dyestuff thus obtained has a good levelling power; it dyes wool red tints which on after-chroming change to gray tints of very good fastness properties.

If the diazo-compound from 2-amino-1-hydroxybenzene is coupled with the same coupling component, a dark-blue water-soluble dyestuff is obtained which dissolves in concentrated sulfuric acid to a bordeaux-red, in sodium carbonate solution to a violet solution and dyes wool on after-chroming fast neutral gray tints.

(4) 14.3 parts of 6-chloro-2-amino-1-hydroxybenzene are diazotized in the usual manner. The diazo-solution is run into a solution containing sodium carbonate in excess and 37 parts of a coupling component obtainable by treating 25.4 parts of 1.5-diamino-3-hydroxynaphthalene-7-sulfonic acid first with 11 parts of chloro-carbonic acid ethyl ester and thereupon with acetic anhydride in an aqueous solution until the acylation is complete.

When the coupling is complete the dyestuff is separated and dried. It is a dark powder which dissolves in dilute acids to a red and in sodium carbonate solution to a blue solution. In concentrated sulfuric acid it dissolves to a bluish-red-solution. It dyes wool red tints which on chroming change to reddish-gray tints of very good fastness to light, to fulling, to carbonizing and to potting.

When 1.5-di-(acetylamino)-3-hydroxynaphthalene-7-sulfonic acid is used as coupling component, a dark dyestuff powder is obtained which dyes wool on chroming similarly fast reddish-gray tints of especially good fastness to light.

When 1.5-di-(carbethoxyamino)-3-hydroxynaphthalene-7-sulfonic acid is used as coupling component a dark dyestuff powder is obtained which dyes wool on chroming a more vivid blue-gray tint.

(5) 17.8 parts of 4.6-dichloro-2-amino-1-hydroxybenzene are diazotized in the usual manner. The diazo-compound is salted out by means of sodium chloride, filtered with suction and introduced in the form of a paste into a solution of 33.8 parts of 1.5-di-(acetylamino)-3-hydroxynaphthalene-7-sulfonic acid containing sodium carbonate in excess. The whole is stirred until the coupling is complete.

The dyestuff obtained is separated and dried. It is a violet powder which dissolves in dilute mineral acids as well as in acetic acid to a red, in alkaline solutions to a blue and in concentrated sulfuric acid to a violet solution. The dyestuff dyes wool red tints which on after-chroming change to gray tints of very good fastness to light, to carbonizing, to fulling and to potting. The dyestuff also has a good levelling power.

A dyestuff of similar properties is obtained when 3.4.6-trichloro-2-amino-1-hydroxybenzene is used as diazo-component.

(6) A suspension of the diazo compound of 18.8 parts of 4-chloro-5-nitro-2-amino-1-hydroxybenzene is combined with a solution of 33.8 parts of 1.5-di-(acetylamino)-3-hydroxynaphthalene-7-sulfonic acid containing an excess of sodium carbonate. The formed dyestuff is, when dry, a dark violet powder soluble in concentrated sulfuric acid with a violet, in a dilute caustic soda solution with a bluish-red and in dilute mineral acids with a red color, and dyes wool from an acid bath red shades turning, when after-chromed, to a greenish-gray of good fastness. A similar dyestuff is obtained when combining, in the same manner, the diazo compound of 5-nitro-2-amino-1-hydroxybenzene with the 1.5 - di(carbethoxy-amino)-3-hydroxynaphthalene-7-sulfonic acid.

We claim:

1. The azo-dyestuffs corresponding with the following general formula:

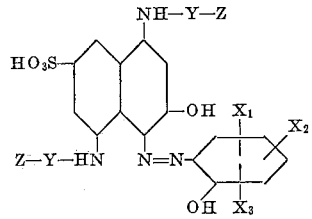

wherein $X_1$ stands for a member of the group consisting of hydrogen, halogen, nitro and the sulfonic acid group, $X_2$ for a member of the group consisting of hydrogen, alkyl and halogen, and $X_3$ for a member of the group consisting of hydrogen and halogen, the Y's stand for a member of the group consisting of CO and $SO_2$ and the Z's for a member of the group consisting of alkyl, O-alkyl and aryl of the benzene series, yielding on wool, when after-chromed, gray to greenish-gray dyeings of good fastness properties, especially of good fastness to light.

2. The azo-dyestuff corresponding with the following formula:

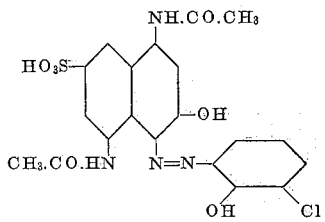

yielding on wool, when after-chromed, reddish-gray dyeings of good fastness properties, especially of very good fastness to light.

3. The azo-dyestuff corresponding with the following formula:

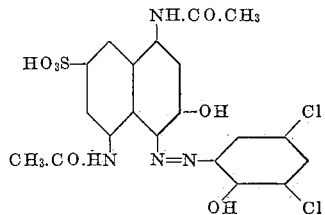

yielding on wool, when after-chromed, gray dyeings of very good fastness to light, to carbonizing, to fulling and to potting.

4. The azo-dyestuff corresponding with the following formula:

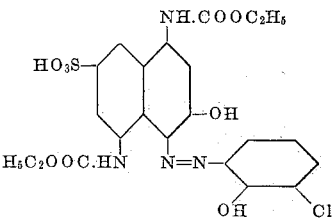

yielding on wool, when after-chromed, vivid bluish-gray dyeings of good fastness properties, especially of very good fastness to light.

RICHARD FLEISCHHAUER.
ADOLF MÜLLER.